United States Patent
Cai

(10) Patent No.: US 7,346,118 B2
(45) Date of Patent: Mar. 18, 2008

(54) METHOD AND APPARATUS FOR GENERATING A 64 STATE 4-D TRELLIS CODE IN DMT

(75) Inventor: Lujing Cai, Morganville, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 741 days.

(21) Appl. No.: 10/644,023

(22) Filed: Aug. 20, 2003

(65) Prior Publication Data

US 2004/0038654 A1 Feb. 26, 2004

Related U.S. Application Data

(60) Provisional application No. 60/404,390, filed on Aug. 20, 2002.

(51) Int. Cl.
*H04L 5/12* (2006.01)
(52) U.S. Cl. ............ 375/265; 375/261; 704/242; 714/758; 714/792
(58) Field of Classification Search ......... 375/265; 341/50; 714/758; 455/130
See application file for complete search history.

(56) References Cited

U.S. PATENT DOCUMENTS

| | | | |
|---|---|---|---|
| 4,713,817 A * | 12/1987 | Wei | .............. 714/758 |
| 4,788,694 A | 11/1988 | Calderbank | |
| 4,980,897 A * | 12/1990 | Decker et al. | .............. 375/265 |
| 5,159,610 A | 10/1992 | Eyuboglu et al. | |
| 5,486,825 A * | 1/1996 | Cole | .............. 341/50 |
| 5,621,761 A | 4/1997 | Heegard | |
| 5,844,922 A | 12/1998 | Wolf et al. | |
| 5,862,155 A | 1/1999 | Lomp et al. | |
| 6,131,180 A | 10/2000 | Ramesh | |
| 2001/0031017 A1 | 10/2001 | Betts | |

OTHER PUBLICATIONS

"Asymmetric digital subscriber line (ADSL) transceivers," G.992.1, International Telecommunication Union, Jun. 1999, pp. 42-52.
Tanaka, Hirokazu et al., "An Application of Trellis Coded Modulation to Digital Microwave Radio and Its Performance," IEEE, May 23, 1993, pp. 128-132.
International Search Report.

* cited by examiner

*Primary Examiner*—David C. Payne
*Assistant Examiner*—Adolf DSouza
(74) *Attorney, Agent, or Firm*—Thomas, Kayden, Horstemeyer & Risley LLP

(57) ABSTRACT

A method and apparatus for encoding data bits in a DMT modulation system is provided utilizing a 64-state Trellis encoder to achieve further improvement in the achievable coding gain by employing coset partitioning, bit conversion, and constellation encoding that fit the DMT modulation. The coding gain of the new coder is around 5.63 dB, which is about 0.96 dB higher than the current Trellis coder in the DMT standard.

20 Claims, 11 Drawing Sheets

| | | | | | | | |
|---|---|---|---|---|---|---|---|
| 1 | 7 | 5 | 3 | 1 | 7 | 5 | 3 |
| 4 | 2 | 0 | 6 | 4 | 2 | 0 | 6 |
| 5 | 3 | 1 | 7 | 5 | 3 | 1 | 7 |
| 0 | 6 | 4 | 2 | 0 | 6 | 4 | 2 |
| 1 | 7 | 5 | 3 | 1 | 7 | 5 | 3 |
| 4 | 2 | 0 | 6 | 4 | 2 | 0 | 6 |
| 5 | 3 | 1 | 7 | 5 | 3 | 1 | 7 |
| 0 | 6 | 4 | 2 | 0 | 6 | 4 | 2 |

Figure 2

| 4D family | 4D sub family | 4D codeset | u5 | u4 | u3 | u2 | u1 | u0 | v'2 | v'1 | v'0 | w'2 | w'1 | w'0 | 1st 2D codeset | 2nd 2D codeset |
|---|---|---|---|---|---|---|---|---|---|---|---|---|---|---|---|---|
| 0 | 0 | 0 | 0 0 | 0 0 | 0 0 | 0 0 | 0 0 | 0 0 | 0 1 | 0 0 | 0 0 | 0 1 | 0 0 | 0 0 | 0 4 | 0 4 |
| 0 | 0 | 1 | 0 1 | 1 1 | 0 0 | 0 0 | 0 0 | 0 0 | 0 1 | 0 0 | 0 0 | 1 0 | 0 0 | 0 0 | 0 4 | 4 0 |
| 0 | 0 | 2 | 0 1 | 0 0 | 1 1 | 0 0 | 0 0 | 0 0 | 0 1 | 1 1 | 1 1 | 0 1 | 1 1 | 1 1 | 3 7 | 3 7 |
| 0 | 0 | 3 | 0 1 | 1 1 | 1 1 | 0 0 | 0 0 | 0 0 | 0 1 | 1 1 | 1 1 | 1 0 | 1 1 | 1 1 | 3 7 | 7 3 |
| 0 | 4 | 4 | 0 1 | 0 0 | 0 0 | 1 1 | 0 0 | 0 0 | 0 1 | 0 0 | 0 0 | 0 1 | 1 1 | 1 1 | 0 4 | 3 7 |
| 0 | 4 | 5 | 0 1 | 1 1 | 0 0 | 1 1 | 0 0 | 0 0 | 0 1 | 0 0 | 0 0 | 1 0 | 1 1 | 1 1 | 0 4 | 7 3 |
| 0 | 4 | 6 | 0 1 | 0 0 | 1 1 | 1 1 | 0 0 | 0 0 | 0 1 | 1 1 | 1 1 | 0 1 | 0 0 | 0 0 | 3 7 | 0 4 |
| 0 | 4 | 7 | 0 1 | 1 1 | 1 1 | 1 1 | 0 0 | 0 0 | 0 1 | 1 1 | 1 1 | 1 0 | 0 0 | 0 0 | 3 7 | 4 0 |
| 0 | 2 | 8 | 0 1 | 0 0 | 0 0 | 0 0 | 1 1 | 0 0 | 0 1 | 1 1 | 0 0 | 0 1 | 1 1 | 0 0 | 2 6 | 2 6 |
| 0 | 2 | 9 | 0 1 | 1 1 | 0 0 | 0 0 | 1 1 | 0 0 | 0 1 | 1 1 | 0 0 | 1 0 | 1 1 | 0 0 | 2 6 | 6 2 |
| 0 | 2 | 10 | 0 1 | 0 0 | 1 1 | 0 0 | 1 1 | 0 0 | 0 1 | 0 0 | 1 1 | 0 1 | 0 0 | 1 1 | 1 5 | 1 5 |
| 0 | 2 | 11 | 0 1 | 1 1 | 1 1 | 0 0 | 1 1 | 0 0 | 0 1 | 0 0 | 1 1 | 1 0 | 0 0 | 1 1 | 1 5 | 5 1 |
| 0 | 6 | 12 | 0 1 | 0 0 | 0 0 | 1 1 | 1 1 | 0 0 | 0 1 | 1 1 | 0 0 | 0 1 | 0 0 | 1 1 | 2 6 | 1 5 |
| 0 | 6 | 13 | 0 1 | 1 1 | 0 0 | 1 1 | 1 1 | 0 0 | 0 1 | 1 1 | 0 0 | 1 0 | 0 0 | 1 1 | 2 6 | 5 1 |
| 0 | 6 | 14 | 0 1 | 0 0 | 1 1 | 1 1 | 1 1 | 0 0 | 0 1 | 0 0 | 1 1 | 0 1 | 1 1 | 0 0 | 1 5 | 2 6 |
| 0 | 6 | 15 | 0 1 | 1 1 | 1 1 | 1 1 | 1 1 | 0 0 | 0 1 | 0 0 | 1 1 | 1 0 | 1 1 | 0 0 | 1 5 | 6 2 |
| 1 | 1 | 16 | 0 1 | 0 0 | 0 0 | 0 0 | 0 0 | 1 1 | 0 1 | 0 0 | 0 0 | 0 1 | 1 1 | 0 0 | 0 4 | 2 6 |
| 1 | 1 | 17 | 0 1 | 1 1 | 0 0 | 0 0 | 0 0 | 1 1 | 0 1 | 0 0 | 0 0 | 1 0 | 1 1 | 0 0 | 0 4 | 6 2 |
| 1 | 1 | 18 | 0 1 | 0 0 | 1 1 | 0 0 | 0 0 | 1 1 | 0 1 | 1 1 | 1 1 | 0 1 | 0 0 | 1 1 | 3 7 | 1 5 |
| 1 | 1 | 19 | 0 1 | 1 1 | 1 1 | 0 0 | 0 0 | 1 1 | 0 1 | 1 1 | 1 1 | 1 0 | 0 0 | 1 1 | 3 7 | 5 1 |
| 1 | 5 | 20 | 0 1 | 0 0 | 0 0 | 1 1 | 0 0 | 1 1 | 0 1 | 0 0 | 0 0 | 0 1 | 0 0 | 1 1 | 0 4 | 1 5 |
| 1 | 5 | 21 | 0 1 | 1 1 | 0 0 | 1 1 | 0 0 | 1 1 | 0 1 | 0 0 | 0 0 | 1 0 | 0 0 | 1 1 | 0 4 | 5 1 |
| 1 | 5 | 22 | 0 1 | 0 0 | 1 1 | 1 1 | 0 0 | 1 1 | 0 1 | 1 1 | 1 1 | 0 1 | 1 1 | 0 0 | 3 7 | 2 6 |
| 1 | 5 | 23 | 0 1 | 1 1 | 1 1 | 1 1 | 0 0 | 1 1 | 0 1 | 1 1 | 1 1 | 1 0 | 1 1 | 0 0 | 3 7 | 6 2 |
| 1 | 3 | 24 | 0 1 | 0 0 | 0 0 | 0 0 | 1 1 | 1 1 | 0 1 | 1 1 | 0 0 | 0 1 | 0 0 | 0 0 | 2 6 | 0 4 |
| 1 | 3 | 25 | 0 1 | 1 1 | 0 0 | 0 0 | 1 1 | 1 1 | 0 1 | 1 1 | 0 0 | 1 0 | 0 0 | 0 0 | 2 6 | 4 0 |
| 1 | 3 | 26 | 0 1 | 0 0 | 1 1 | 0 0 | 1 1 | 1 1 | 0 1 | 0 0 | 1 1 | 0 1 | 1 1 | 1 1 | 1 5 | 3 7 |
| 1 | 3 | 27 | 0 1 | 1 1 | 1 1 | 0 0 | 1 1 | 1 1 | 0 1 | 0 0 | 1 1 | 1 0 | 1 1 | 1 1 | 1 5 | 7 3 |
| 1 | 7 | 28 | 0 1 | 0 0 | 0 0 | 1 1 | 1 1 | 1 1 | 0 1 | 1 1 | 0 0 | 0 1 | 1 1 | 1 1 | 2 6 | 3 7 |
| 1 | 7 | 29 | 0 1 | 1 1 | 0 0 | 1 1 | 1 1 | 1 1 | 0 1 | 1 1 | 0 0 | 1 0 | 1 1 | 1 1 | 2 6 | 7 3 |
| 1 | 7 | 30 | 0 1 | 0 0 | 1 1 | 1 1 | 1 1 | 1 1 | 0 1 | 0 0 | 1 1 | 0 1 | 0 0 | 0 0 | 1 5 | 0 4 |
| 1 | 7 | 31 | 0 1 | 1 1 | 1 1 | 1 1 | 1 1 | 1 1 | 0 1 | 0 0 | 1 1 | 1 0 | 0 0 | 0 0 | 1 5 | 4 0 |

|    | vb-1 | vb-2 | vb-3 | vb-4 | Xc | Xc-1 | Yc | Yc-1 |
|---|---|---|---|---|---|---|---|---|
| 0  | 0 | 0 | 0 | 0 | 0 | 0 | 0 | 0 |
| 1  | 0 | 0 | 0 | 1 | 0 | 0 | 0 | 0 |
| 2  | 0 | 0 | 0 | 0 | 0 | 0 | 0 | 0 |
| 3  | 0 | 0 | 0 | 1 | 0 | 0 | 0 | 0 |
| 4  | 0 | 0 | 1 | 0 | 0 | 0 | 1 | 1 |
| 5  | 0 | 0 | 1 | 1 | 0 | 0 | 1 | 1 |
| 6  | 0 | 0 | 1 | 0 | 0 | 0 | 1 | 1 |
| 7  | 0 | 0 | 1 | 1 | 0 | 0 | 1 | 1 |
| 8  | 0 | 1 | 0 | 0 | 1 | 1 | 0 | 0 |
| 9  | 0 | 1 | 0 | 1 | 1 | 1 | 0 | 0 |
| 10 | 0 | 1 | 0 | 0 | 1 | 1 | 0 | 0 |
| 11 | 0 | 1 | 0 | 1 | 1 | 1 | 0 | 0 |
| 12 | 0 | 1 | 1 | 0 | 1 | 1 | 1 | 1 |
| 13 | 0 | 1 | 1 | 1 | 1 | 1 | 1 | 1 |
| 14 | 0 | 1 | 1 | 0 | 1 | 1 | 1 | 1 |
| 15 | 0 | 1 | 1 | 1 | 1 | 1 | 1 | 1 |
| 16 | 1 | 0 | 0 | 0 | 1 | 1 | 0 | 1 |
| 17 | 1 | 0 | 0 | 1 | 0 | 0 | 1 | 0 |
| 18 | 1 | 0 | 0 | 0 | 1 | 0 | 0 | 0 |
| 19 | 1 | 0 | 0 | 1 | 1 | 0 | 0 | 0 |
| 20 | 1 | 0 | 1 | 0 | 0 | 0 | 0 | 1 |
| 21 | 1 | 0 | 1 | 1 | 0 | 1 | 0 | 0 |
| 22 | 1 | 0 | 1 | 0 | 0 | 0 | 0 | 1 |
| 23 | 1 | 0 | 1 | 1 | 1 | 0 | 1 | 1 |
| 24 | 1 | 1 | 0 | 0 | 0 | 1 | 0 | 0 |
| 25 | 1 | 1 | 0 | 1 | 1 | 1 | 1 | 0 |
| 26 | 1 | 1 | 0 | 0 | 1 | 0 | 1 | 1 |
| 27 | 1 | 1 | 0 | 1 | 1 | 1 | 1 | 0 |
| 28 | 1 | 1 | 1 | 0 | 0 | 1 | 1 | 1 |
| 29 | 1 | 1 | 1 | 1 | 0 | 1 | 1 | 1 |
| 30 | 1 | 1 | 1 | 0 | 1 | 1 | 0 | 1 |
| 31 | 1 | 1 | 1 | 1 | 0 | 0 | 1 | 0 |

Figure 9

|   |   |   | 5 | 3 | 1 | 7 | 5 | 3 | 1 | 7 |   |   |
|---|---|---|---|---|---|---|---|---|---|---|---|---|
|   |   |   | 0 | 6 | 4 | 2 | 0 | 6 | 4 | 2 |   |   |
| 5 | 3 | 1 | 7 | 5 | 3 | 1 | 7 | 5 | 3 | 1 | 7 |   |
| 0 | 6 | 4 | 2 | 0 | 6 | 4 | 2 | 0 | 6 | 4 | 2 |   |
| 1 | 7 | 5 | 3 | 1 | 7 | 5 | 3 | 1 | 7 | 5 | 3 |   |
| 4 | 2 | 0 | 6 | 4 | 2 | 0 | 6 | 4 | 2 | 0 | 6 |   |
| 5 | 3 | 1 | 7 | 5 | 3 | 1 | 7 | 5 | 3 | 1 | 7 |   |
| 0 | 6 | 4 | 2 | 0 | 6 | 4 | 2 | 0 | 6 | 4 | 2 |   |
| 1 | 7 | 5 | 3 | 1 | 7 | 5 | 3 | 1 | 7 | 5 | 3 |   |
| 4 | 2 | 0 | 6 | 4 | 2 | 0 | 6 | 4 | 2 | 0 | 6 |   |
|   |   |   | 1 | 7 | 5 | 3 | 1 | 7 | 5 | 3 |   |   |
|   |   |   | 4 | 2 | 0 | 6 | 4 | 2 | 0 | 6 |   |   |

Figure 10

METHOD AND APPARATUS FOR GENERATING A 64 STATE 4-D TRELLIS CODE IN DMT

CROSS-REFERENCE TO RELATED APPLICATIONS

The present application claims priority to U.S. Provisional Patent Application No. 60/404,390 entitled "Method and Apparatus For Generating A 64-State 4-D Trellis Code In DMT" filed Aug. 20, 2002, the entirety of which is incorporated by reference herein.

BACKGROUND OF THE INVENTION

The present invention relates generally to the field of telecommunications and, more particularly, to data communications over telephone networks and more specifically to voice band modems operating at data signaling rates of up to 33600 bits/second for use on telephone switched networks and leased point-to-point two-wire telephone type circuits in which a method for improving noise immunity using a 64 state four-dimensional (4D) Trellis coder in the DMT (discrete multi-tone) physical layer.

The explosive growth of internet has created a demand for high data rates for home users that rely on standard analog plain old telephone systems (POTS) that use a copper wire twisted pair to carry the information. The need for high-speed access to the home is inevitable due to the availability of information, data, high-bandwidth video and the like from the world wide web and because of such demand, higher speed modems are required. Modems operating at higher rates of up to 33,600 bits/second are in use nowadays. A multitude of competing communication technologies provide high-speed access to the home such as cable modems, digital subscriber line (xDSL) that utilizes the existing analog plain old telephone systems (POTS) that use a copper wire twisted pair to carry the information. Because of bandwidth limitation (4 KHz), and power limitation of the telephone network, line coding schemes are used to encode digital signals into analog signals that convey the analog information over the analog telephone network, such line coding schemes should avoid undesirable bandwidth or power increase. The line coding schemes manipulate the analog carrier signal which has three attributes (amplitude, phase and frequency) of which one or more of such attributes are manipulated by known modulation techniques, one of which is quadrature amplitude modulation (QAM) whereby the carrier signal's phase and amplitude is modulated in order to encode more data within a frequency bandwidth. One example of a QAM modulation system sends two bits of information per QAM symbol, where the digital values can be encoded and the corresponding amplitude and phase can be represented using the constellation. By increasing the constellation size and in the meantime the bit density per symbol will be increased, hence achieving higher data rates. As the constellation size increases, the granularity of the phase and the amplitude difference between different constellation points diminishes, making it increasingly difficult to decode the constellation points, especially in the presence of noise. One way of circumventing such a problem is to increase the Euclidean distance between symbols employing Trellis coding which is a bandwidth efficient, since the symbol rate and, hence the bandwidth is not increased. As the constellation size gets bigger, the problem of detecting constellation due to density increases and shorter Euclidean distance between symbols, therefore it is desirable to introduce redundancy without doubling the constellation size. Therefore, a way of counteracting the effects the short Euclidean distance between symbols is to partition the quadrature amplitude modulated signal into subsets, thereby creating an acceptable Euclidean distance between symbols.

Data from a personal computer or other equipment at the customer premise (CPE) is sent to a transmitter which arranges the data into frame packets; the packetized signal is then quadrature amplitude modulation encoded and error encoded using trellis encoding to improve the noise immunity using a convolutional coder to select a sequence of subsets in a partitioned signal constellation. A numerical symbol vector is trellis encoded. The trellis encoding starts with the most significant symbol and ends with the least significant symbol of the vector, a process which employs convolutional encoding that converts the input symbol to another symbol and then maps the encoded symbol to its corresponding 16 QAM signal constellation point. The current trellis encoder in the DMT (discrete multi tone) standard is a 4-D (four-dimensional), 16-state Wei encoder which is a ¾ encoder with a coding gain of 4.6 dB (it varies depending on the bits per bin). The 4-D symbol is formed by 2 bins, each of which contains 2-D (two-dimensional) constellations partitioned into four 2-D co-sets which are further partitioned into 8 4-D co-sets. The minimum squared distance (MSD) of the 4-D co-set is $4d^2_0$ and the branch minimum squared distance trellis tree is also $4d^2_0$. This invention is an improvement on the existing 64 state 4-D trellis encoder recommended by the ITU-T (international telecommunication union).

Since the Euclidean distance between symbols is a paramount feature of the QAM signal, and since the discrete multi-tone modulation scheme employed by some of the high data rate systems such as DSL requires transmitting of at least three DMT symbols per bin, there is a need to use Trellis codes in DMT.

BRIEF SUMMARY OF THE INVENTION

The present invention provides a method and apparatus for encoding data bits in DMT modulation system utilizing a 64-state Trellis encoder in order to achieve further improvement in the achievable coding gain by employing coset partitioning, bit conversion, and constellation encoder that fit the DMT modulation.

In one embodiment of the present invention, a method and system of Trellis encoding is initiated with receiving at least five input data bits and encoding at least four data bits of the received bits using a convolutional encoder, such an encoder employs 4/5 encoding process with at least six stages to encode the bits, the encoded bits are used to generate a redundant bit using a Trellis state machine. The encoded bits, the generated redundant bit as well as any raw uncoded data are passed onto a constellation mapper in order to create two 2-D coset groups, and the state machine is returned to zero once the all the 256 DMT bins are mapped into.

In another embodiment of the a present invention, At the end of each DMT symbol, the Trellis state machine has to be forced to return to 0 state and tied to the state of the state machine as required by the DMT standard. To achieve this, the following constraint has to applied, for both of the final two 4-D symbols, two separate steps are taken in order to create such state, and to improve rate, the termination may performed once several DMT symbols or completely eliminated.

BRIEF DESCRIPTION OF THE DRAWINGS

The present invention can be understood more completely by reading the following Detailed Description of the Preferred Embodiments, in conjunction with the accompanying drawings and tables.

FIG. 2 is an 2-D co-sets of partitioning of the Right constellation.

FIG. 3 is a 2-D and 4-D co-set conversion table.

FIG. 6 is an state transition table.

FIG. 7 is Co-set transition table.

FIG. 8 is a 3-bit constellation mapping.

FIG. 9 is a table to the top two bits of X and Y in the constellation mapping.

FIG. 10 is a 7-bit constellation mapping.

DETAILED DESCRIPTION OF THE PREFERRED EMBODIMENTS

The following description is intended to convey a thorough understanding of the invention by providing a number of specific embodiments and details involving the Trellis code in the DMT physical layer for further performance enhancement techniques. Various improvements and modifications to the preferred embodiments will become apparent to those skilled in the art, and the general principles defined herein may be applied to other embodiments. Therefore, the present invention is not limited to the specific embodiments shown and described, but interpreted to a larger scope consistent with the novel features disclosed herein.

Figure 1:
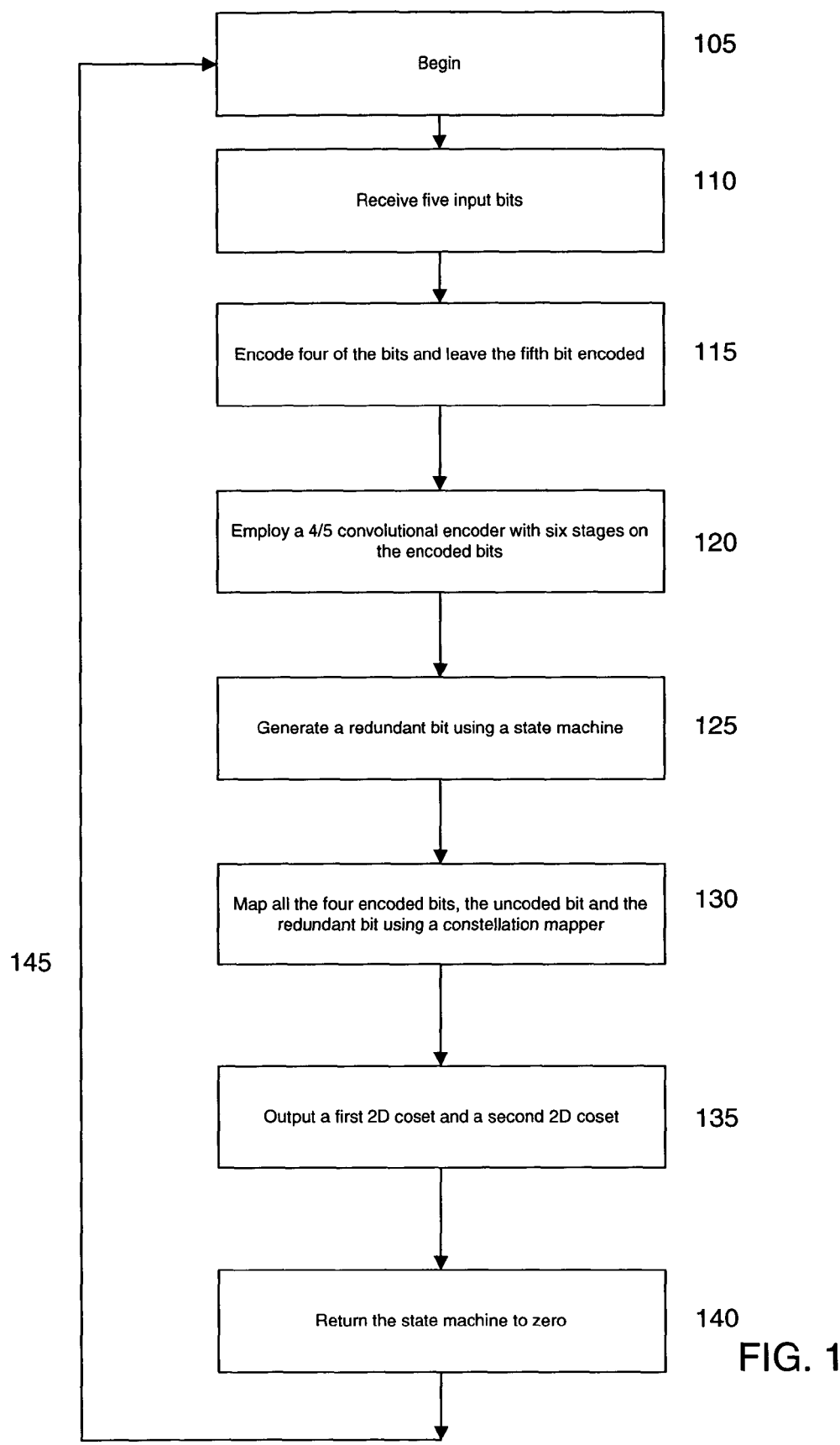
FIG. 1 is flow chart illustrating the encoding method according to one of the embodiments of the present invention.

In one embodiment of the present invention and in reference to FIG. 1, a method and system of Trellis encoding begins with receiving at least five input data bits in step 110, and encoding at least four data bits of the received bits using a convolutional encoder in step 115, such an encoder employs 4/5 encoding process with at least six stages to encode the bits as shown in step 120, the encoded bits are used to generate a redundant bit using a Trellis state machine in step 125. In step 130, the encoded bits, the generated redundant bit as well as any raw uncoded data is passed onto a constellation mapper in order to create two 2-D coset groups in step 135. In step 140, the state machine is returned to zero once the all the 256 DMT bins are mapped into, and finally in step 145, the steps are repeated in order to map the following DMT bins.

In reference to FIG. 2, and in accordance to one embodiment of the present invention, a 64-state 4-D Trellis code is employed in the DMT physical layer for further performance enhancement. This Trellis encoder which is based on the 4-D 64-state Wei encoder defined in the ITU-T Recommendation V.34 may cope with the DMT constellation signaling. The theoretical coding gain of the new coder is around 5.63 dB, about 0.96 dB higher than the current Trellis coder in the DMT standard.

Figure 4:
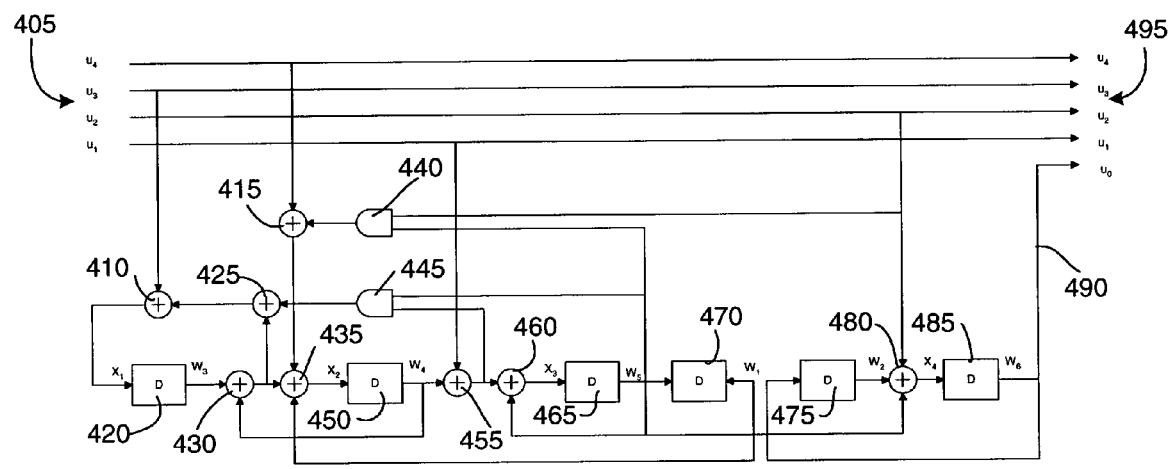
FIG. 4 is a state machine of a convolution encoder.

According to another embodiment of the present invention, and in reference to FIG. 4, a Trellis coder for use in DMT which is an 4/5 systematic coder, and which employs a 6-state finite machine 400, six-stages 420, 450, 465, 470, 475, and 485. The six stage finite state machine 400 receives four bits 405 and generates one redundant bit 495 from the 4 input bits, $u_3u_2u_1u_0$.

The above state machine can be mathematically expressed as follows:

$$X_4 = u_2 \oplus W_2 \oplus W_5$$

$$X_3 = u_1 \oplus W_4 \oplus W_5$$

$$X_2 = u_4 \oplus W_1 \oplus W_3 \oplus W_4 \oplus (u_2 \& W_5)$$

$$X_1 = u_3 \oplus W_3 \oplus W_4 \oplus (W_5 \& (W_4 \oplus u_1))$$

Figure 5:
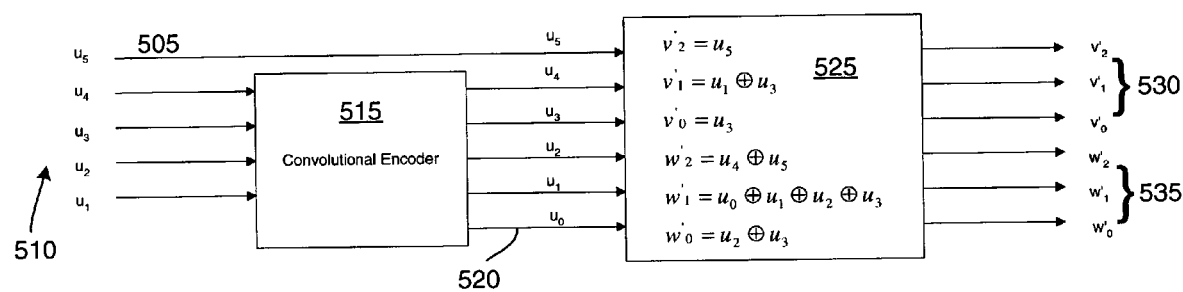
FIG. 5 is the conversion mechanism of 2-D co-sets.
Figure 6:
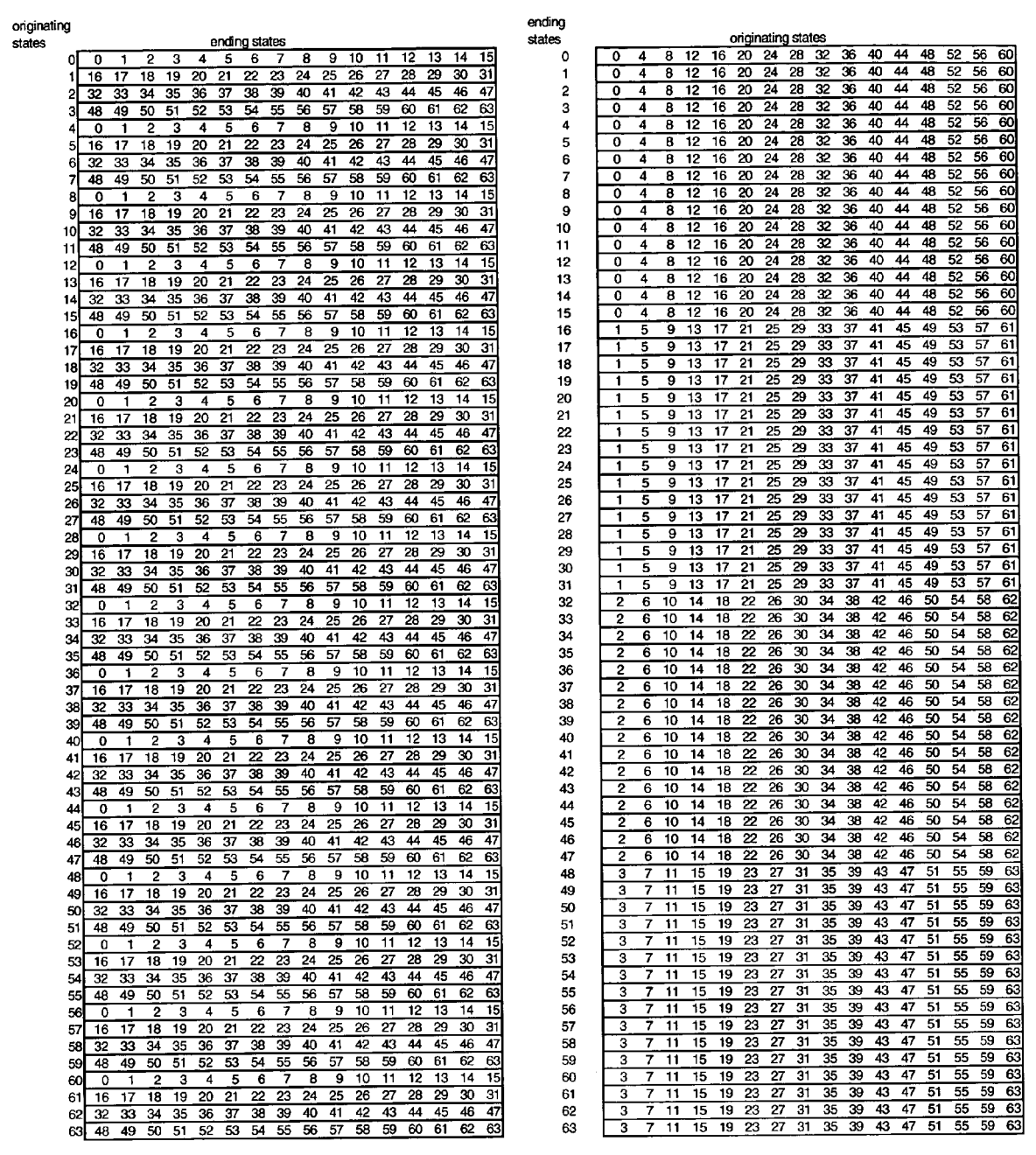
Figure 7:
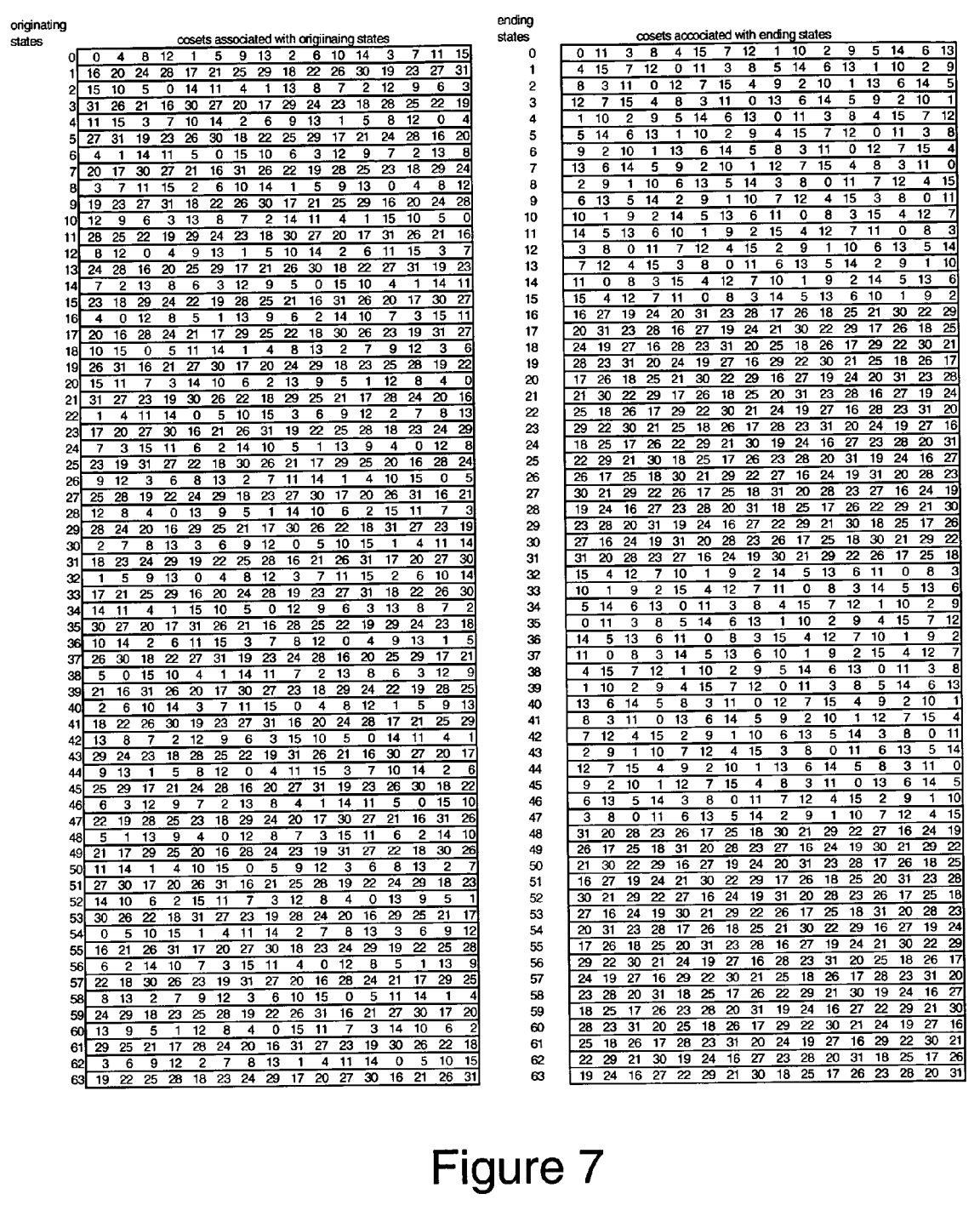
Figure 11:
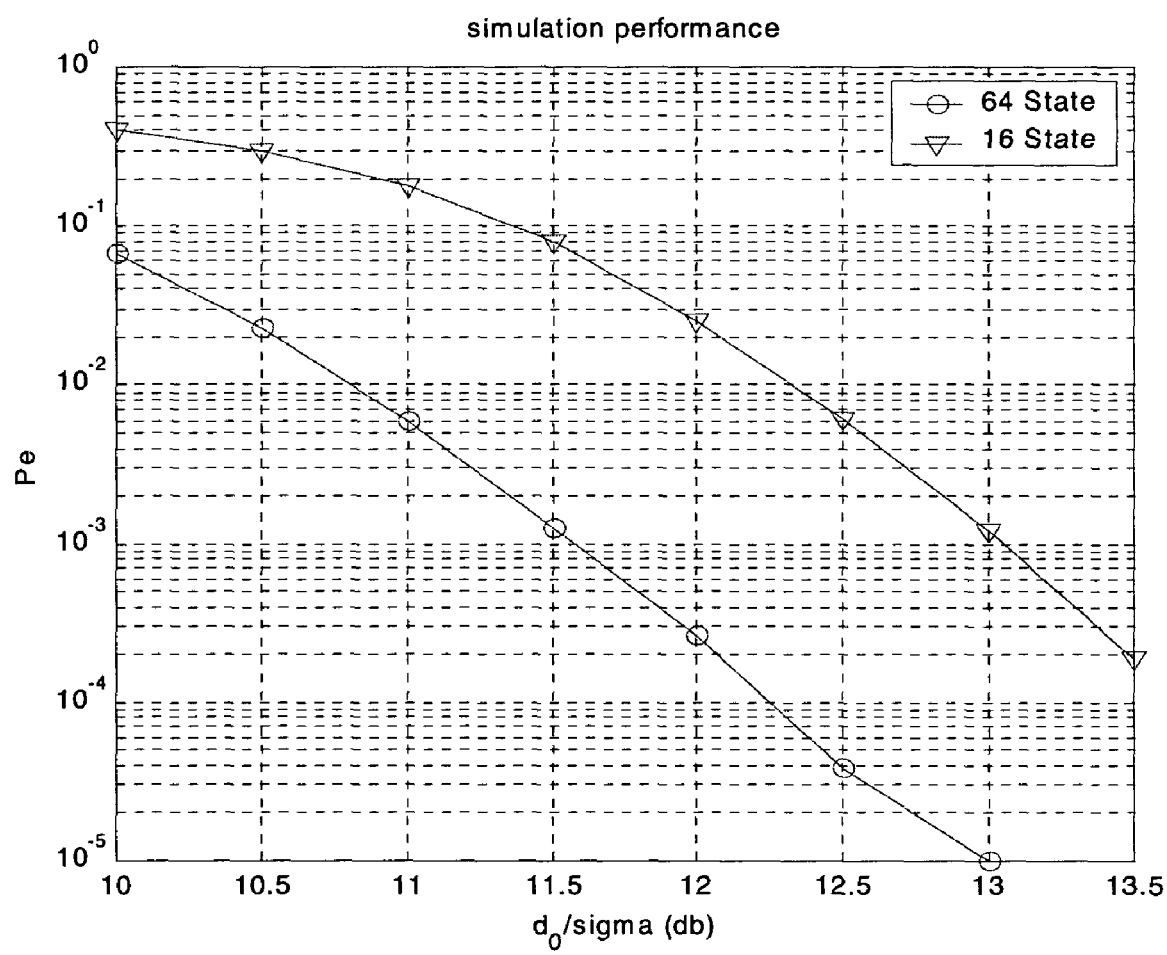
FIG. 11 is a simulation of co-set decoding error comparison.

In another embodiment of the present invention, and in reference to FIG. 5, five input data bits are received 505, and 510, where input data bit 505 is passed onto a constellation mapper 525, while the other four input data bits 510 are encoded in a convolutional encoder 515, and along with a redundant bit 520, passed onto the constellation mapper 525. The encoded bits 510, the generated redundant bit 520 along with the uncoded bit 505 are mapped into the constellation mapper 525, and added together using modulo 2 addition generating a first 3-bit group 530 to be inputted into a one DMT bin and a second 3-bit group 535 to be inputted into a one DMT bin. Bit groups 530 and 535 are used to generate a first 2-D coset and a second 2-D coset as shown in the last two columns of FIG. 3, and the two 2-D cosets are mapped onto the DMT bins. The overall minimum squared distance (MSD) between the two 2-D cosets is calculated to be $5d^2_0$. And considering the constellation expansion due to adding the redundant bit 520, the coding gain is estimated to be around 5.6 dB, slightly varying depending on the total bits/bin. The resulting state and coset transition diagrams are given in the FIGS. 6 and 7.

In yet another embodiment of the present invention, to generate create a 3-bit constellation, each 2-D coset is mapped to one of the 8 points in FIG. 8. The number in the figure represents the 2D coset number ($v'_2v'_1v'_0$ or $w'_2w'_1w'_0$). And to have the mapping point to confine within the constellation set compliant with the DMT standard under the given coset specified by $v'_2v'_1v_0$ for bin 1 and $w'_2w'_1w'_0$ for bin 2, the following conversion is needed:

$$v_0 = v'_0$$

$$v_1 = v'_1$$

$$v_2 = v'_3 + v'_2 + v'_1 + v'_0$$

$$v_3 = v'_3$$

where $v'_3$ is one of the uncoded bits. Together with other uncoded bits, the conversion bits are fed into the conventional encoder in the DMT standard to obtain X and Y in the final constellation mapping. FIG. 2 is an example of 6 bit constellation resulted from the above constellation encoder. For bin 2, the same conversion is done on $w'_3w'_2w'_1w'_0$. In the DMT standard, a table is needed to calculate the last two bits of X and Y to get the given shape of the constellation for odd-numbered bits constellation. To assign the points into right cosets with the 64-state Trellis encoder, the table is modified from the DMT standard, as shown in the FIG. 7. Additionally, since the proposed 64 state Trellis is a 4/5 coder, it is difficult to have both 2-D symbols each having a 2 bit constellation. Only the first 2-D symbol can be set to a 2 bit constellation but assuming $u_5=0$ so that the resulting 2-D coset is restricted to 0-3. This can be verified in FIG. 3.

In another embodiment of the a present invention, At the end of each DMT symbol, the Trellis state machine of FIG. 3 has to be forced to return to 0 state and tied to the state of the state machine as required by the DMT standard. To achieve this, the following constraint has to applied, for both of the final two 4-D symbols of FIG. 2, two separate steps are taken in order to create such a state:

$$u_2 = W_2 \oplus W_5$$

$$u_1 = W_4 \oplus W_5$$

and for the last 4-D symbols.

$$u_4 = W_1 \oplus W_2 W_5 \oplus W_3 \oplus W_4 \oplus W_5$$

$$u_3 = W_3 \oplus W_4 \oplus W_5$$

To improve the encoding rate, such termination may be performed once every 256 DMT bins are mapped into.

What is claimed is:

1. A method of encoding Quadrature Amplitude Modulation (QAM) trellis coded data signals, comprising:
   receiving data bits and inputting into a Trellis encoder;
   encoding some of the received data bits using a Trellis state machine;
   employing a 4/5 convolutional encoder to encode the data bits;
   generating a redundant data bit $u_0$ using a six stage state machine;
   mapping all of the data bits onto a constellation according to the equations:

$$v'_2 = u_5$$

$$v'_1 = u_1 \oplus u_3$$

$$v'_0 = u_3$$

$$w'_2 = u_4 \oplus u_5$$

$$w'_1 = u_0 \oplus u_1 \oplus u_2 \oplus u_3$$

$$w'_0 = u_2 \oplus u_3$$

wherein $u_1$, $u_2$, $u_3$, $u_4$, are the encoded bits; $u_5$ is an uncoded bit, $u_0$ is the redundant bit, and wherein $v'_0$, $v'_1$, $v'_2$, $w'_0$, $w'_1$, $w'_2$ are input into discrete multi-tone (DMT) bins; and
   forcing the Trellis state machine to return to zero state.

2. The method of claim 1, wherein the Trellis encoder is a 4-D 64 state encoder.

3. The method of claim 1, wherein in a 2-D QAM constellation is partitioned into an 8 2-D cosets.

4. The method of claim 3, wherein the 2-D cosets are further partitioned into 32 4-D cosets by combining the constellation of two DMT bins.

5. The method of claim 1, wherein the overall mean squared distance between any two neighboring signals is $5d^2_0$.

6. The method of claim 1, wherein the coding gain is 5.63 dB.

7. The method of claim 1, wherein the Trellis branch diagram is generated by a six stage finite state machine that creates a redundant bit from four input bits.

8. The method of claim 1, wherein forcing of the Trellis state machine to return to zero state is applied at the end of each DMT symbol.

9. The method of claim 1, wherein even-numbered bits are mapped onto the constellation using 3 bits per bin.

10. The method of claim 1, wherein odd-numbered bits are mapped onto the constellation using 3 bits per bin.

11. An apparatus for encoding Quadrature Amplitude Modulation (QAM) trellis coded data signals, comprising:
    a Trellis encoder for receiving data bits to be inputted therein;
    a Trellis state machine for encoding some of the received data bits;
    a 4/5 convolutional encoder to encode the data bits;
    a six stage state machine for generating a redundant data bit; and
    a mapper for mapping all of the data bits onto a constellation, wherein the mapper maps according to the equations:

$$v'_2 = u_5$$

$$v'_1 = u_1 \oplus u_3$$

$$v'_0 = u_3$$

$$w'_2 = u_4 \oplus u_5$$

$$w'_1 = u_0 \oplus u_1 \oplus u_2 \oplus u_3$$

$$w'_0 = u_2 \oplus u_3$$

wherein $v'_0$, $v'_1$, $v'_2$, $w'_0$, $w'_1$, $w'_2$ are input into discrete multi-tone (DMT) bins; $u_1$, $u_2$, $u_3$, $u_4$ are the encoded bits; $u_5$ is an uncoded bit, and $u_0$ is a redundant bit.

12. The apparatus of claim 11, wherein the Trellis encoder is a 4-D 64 state encoder.

13. The method of claim 11, wherein in a 2-D QAM constellation is partitioned into an 8 2-D cosets.

14. The apparatus of claim 13, wherein the 2-D cosets are further partitioned into 32 4-D cosets by combining the constellation of two DMT bins.

15. The apparatus of claim 11, wherein the overall mean squared distance between any two neighboring signals is $5d^2_0$.

16. The apparatus of claim 11, wherein the coding gain is 5.63 dB.

17. The apparatus of claim 11, wherein the Trellis branch diagram is generated by a six stage finite state machine that creates a redundant bit from four input bits.

18. The apparatus of claim 11, wherein forcing of the Trellis state machine to return to zero state is applied at the end of each DMT symbol.

19. The apparatus of claim 11, wherein even-numbered bits are mapped onto the constellation using 3 bits per bin.

20. The apparatus of claim 11, wherein odd-numbered bits are mapped onto the constellation using 3 bits per bin.

* * * * *